United States Patent [19]
Von Bokern et al.

[11] Patent Number: 5,987,628
[45] Date of Patent: Nov. 16, 1999

[54] METHOD AND APPARATUS FOR AUTOMATICALLY CORRECTING ERRORS DETECTED IN A MEMORY SUBSYSTEM

[75] Inventors: Vincent Von Bokern, Rescue; Zohar Bogin; David Freker, both of Folsom, all of Calif.

[73] Assignee: Intel Corporation, Santa Clara, Calif.

[21] Appl. No.: 08/978,807

[22] Filed: Nov. 26, 1997

[51] Int. Cl.⁶ .................................................. G06F 11/00
[52] U.S. Cl. ......................................................... 714/48
[58] Field of Search ........................ 395/185.01, 182.03; 371/40.2, 37.7, 37.12; 714/5, 48, 758, 785

[56] References Cited

U.S. PATENT DOCUMENTS

| | | | |
|---|---|---|---|
| 4,535,455 | 8/1985 | Peterson | 371/13 |
| 4,604,750 | 8/1986 | Manton et al. | 371/38 |
| 4,888,773 | 12/1989 | Arlington et al. | 371/40.2 |
| 4,899,342 | 2/1990 | Potter et al. | 371/10.1 |
| 4,920,539 | 4/1990 | Albonesi | 371/40.2 |
| 4,964,129 | 10/1990 | Bowden, III et al. | 371/40.2 |
| 4,964,130 | 10/1990 | Bowden, III et al. | 371/40.2 |
| 5,127,014 | 6/1992 | Raynham | 371/37.3 |
| 5,233,616 | 8/1993 | Callander | 371/37.7 |
| 5,263,032 | 11/1993 | Porter et al. | 371/10.1 |
| 5,267,242 | 11/1993 | Lavalle et al. | 371/10.1 |
| 5,274,645 | 12/1993 | Idleman et al. | 371/10.1 |
| 5,274,646 | 12/1993 | Brey et al. | 371/40.1 |
| 5,325,375 | 6/1994 | Westberg | 371/51.1 |
| 5,367,526 | 11/1994 | Kong | 371/51.1 |
| 5,388,108 | 2/1995 | DeMoss et al. | 371/51.1 |
| 5,392,302 | 2/1995 | Kemp et al. | 371/51.1 |
| 5,428,630 | 6/1995 | Weng et al. | 371/40.1 |
| 5,430,742 | 7/1995 | Jeddeloh et al. | 371/40.1 |
| 5,588,112 | 12/1996 | Dearth et al. | 395/182.07 |
| 5,644,583 | 7/1997 | Garcia et al. | 371/40.2 |

FOREIGN PATENT DOCUMENTS

| | | |
|---|---|---|
| 1340283 | 12/1973 | United Kingdom . |
| 1511806 | 5/1978 | United Kingdom . |
| 2064840A | 6/1981 | United Kingdom . |
| 2197098A | 5/1988 | United Kingdom . |

OTHER PUBLICATIONS

PCT Search Report in connection with International Application No. PCT/US98/22417 mailed Mar. 31, 1999 (6 pages).
New DRAM Technologes, A Comprehensive Analysis of The New Architectures, "Revolutionary Alternatives", Steven A. Przybylski, 1994, pp. i–xiii and 259–306.
Search Report under Section 17, Application No. GB 9504087.9, dtd. Jun. 5, 1995.
PCT Search Report, International Application No. PCT/US95/06548, May 23, 1995.

*Primary Examiner*—Robert W. Beausoliel, Jr.
*Assistant Examiner*—Stephen C. Elmore
*Attorney, Agent, or Firm*—Blakely, Sokoloff, Taylor & Zafman LLP

[57] ABSTRACT

An apparatus and method for correcting corrupted data. Access logic accesses a memory. Error detection logic generates an error signal for each data value output by the memory to indicate whether the data value has a correctable error. Correction logic requests the access logic to write to the memory a corrected version of each data value indicated by the error signal to have a correctable error.

25 Claims, 10 Drawing Sheets

SEQUENCE OF OPERATIONS
1) READ FROM ADDR   0 500 000   NO ERROR
2) READ FROM ADDR   2 000 000   ERROR
3) READ FROM ADDR   3 000 000   NO ERROR
4) READ FROM ADDR   4 000 000   ERROR
5) READ FROM ADDR   5 000 000   NO ERROR
FIG. 6A
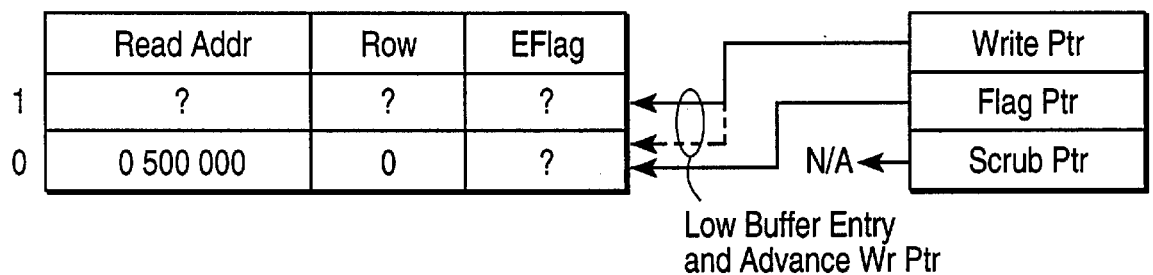
FIG. 6B
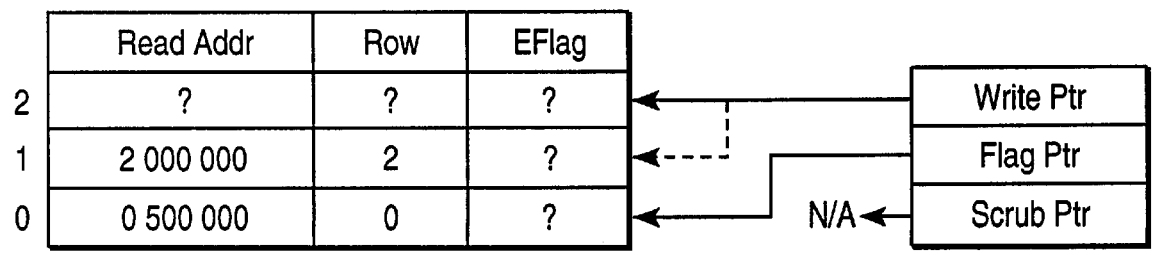
FIG. 6C

METHOD AND APPARATUS FOR AUTOMATICALLY CORRECTING ERRORS DETECTED IN A MEMORY SUBSYSTEM

FIELD OF THE INVENTION

The present invention relates to the field of memory management, and more particularly to correcting corrupted data in a memory subsystem.

BACKGROUND OF THE INVENTION

Some modern computers use error recovery techniques to automatically correct corrupted data read from a memory subsystem. In one error recovery technique, for example, error correction codes (ECCs) are stored in the memory subsystem along with each data value. When a data value is written to memory in a computer system that uses an ECC-based error recovery technique, the data value is passed through combinatorial logic to generate an ECC value. The ECC value may be thought of as a signature that corresponds to the original data value and is stored in memory along with the data value. Later, when the data value is read from memory, the ECC value is output along with the data value and both the ECC and data values are input to a syndrome generator. The syndrome generator generates a value called a syndrome that is typically zero-valued if the data value has not become corrupt and non-zero otherwise. (Herein, a corrupt data value refers to a data value in which one or more bits have become inverted relative to their correct state.)

The syndrome is input to flip vector generator where it is used to index a table of values called flip vectors. In a system that is capable of correcting a single bit error, the table of flip vectors typically includes one entry for every possible bit position in a data value, with each entry having a single set bit in a different bit position than the other entries. Thus, by exclusive-OR combination of a data value having a single bit error and the appropriate flip vector, the failed bit is flipped to recover the original data value. Because the error correction typically takes place in the transmission path between the memory and the consumer of the data value (e.g., a processor, graphics accelerator, etc.), the error correction is transparent to the consumer.

One limitation to the above-described error recovery technique is that, if the source of data corruption is the value stored in memory (due, for example, to a transient event during transfer of the data value to the memory or while the data value is stored in the memory), then correction of a single bit failure when the data value is read from the memory does not correct the corrupted value in the memory itself. In other words, even though a recovered data value is delivered to a consumer, the data value in the memory subsystem remains corrupted. This is significant because many computer systems employ error recovery techniques that can correct a single bit error, but not a multiple bit error. Consequently, in such systems, if one or more additional bits of an already corrupt data value are erroneously flipped, the data value will have become irrecoverably corrupt.

SUMMARY OF THE INVENTION

An apparatus and method for correcting corrupted data are disclosed. Access logic is provided to access a memory. For each data value output by the memory, error detection logic generates an error signal indicating whether the data value has a correctable error. For each data value indicated by the error signal to have a correctable error, correction logic requests the access logic to write a corrected version of the data value to the memory.

BRIEF DESCRIPTION OF THE DRAWINGS

The present invention is illustrated by way of example and not limitation in the figures of the accompanying drawings in which like references indicate similar elements and in which:

FIG. 6A is an exemplary list of commands to read data from a memory subsystem;

FIG. 6B depicts a scrub buffer after a first read operation has been initiated;

FIG. 6C depicts the scrub buffer after a second read operation has been initiated;

DETAILED DESCRIPTION

According to various embodiments of the present invention, addresses asserted in memory read operations are snooped by memory correction logic and stored in a buffer. As each of the data values corresponding to the stored addresses are output from memory, the data value is input to error logic that signals the memory correction logic if a correctable error is detected and that generates a corrected version of the data value. If a correctable error is detected in a data value, the memory correction logic issues a request to write the corrected version of the data value back to memory at the address from the buffer that corresponds to the data value. The corrected version of the data value is then written back to the memory at the address from which it was read, overwriting the corrupted data value with corrected data. Because the corrupted data is corrected in the memory and not just in the transmission path to a consumer, it becomes much less likely that further corrupting events will cause the data to become irrecoverable. As a result, overall system reliability is enhanced.

Figure 1:
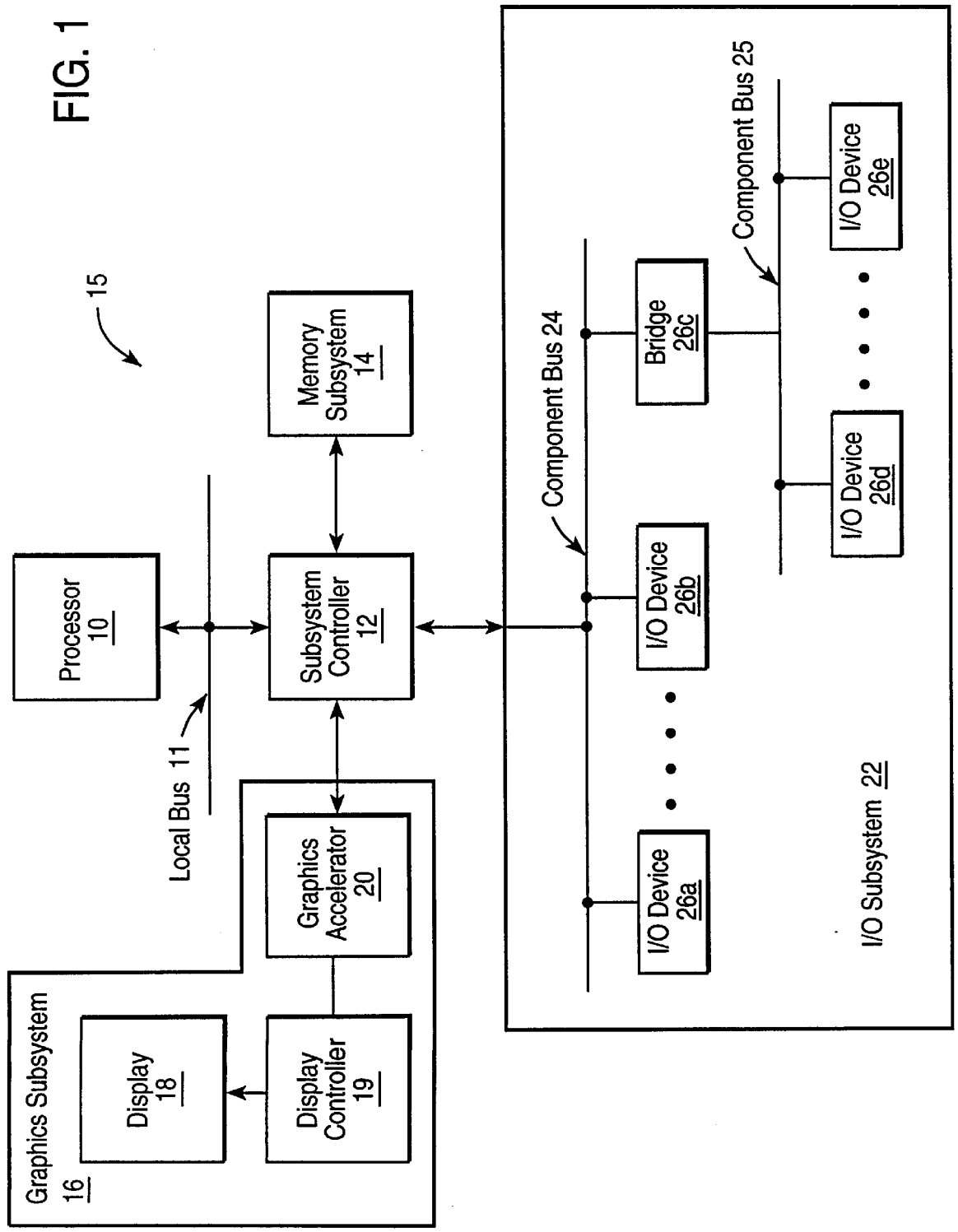
FIG. 1 is a block diagram of an apparatus in which one or more embodiments of the present invention may be used.

FIG. 1 is a block diagram of an apparatus 15 in which one or more embodiments of the present invention may be used.

The apparatus 15 includes a processor 10, a memory subsystem 14, a graphics subsystem 16 and an I/O subsystem 22, all coupled to a subsystem controller 12. In one embodiment, the processor 10 is coupled to the subsystem controller 12 via a local bus 11. The graphics subsystem 16, memory subsystem 14 and I/O subsystem 22 are likewise coupled to the subsystem controller via respective buses.

The memory subsystem 14 is typically made up of semiconductor random-access memory (RAM) such as extended-data-out, dynamic RAM (EDO DRAM) or synchronous dynamic RAM (SDRAM). Other types of memory devices, including RAMBUS® DRAM devices developed by Rambus®, Inc. of Mountain View, Calif. and static RAM devices (SRAM), may also be used.

The I/O subsystem 22 is made up of one or more component buses (24, 25) to which various I/O devices (26A, 26B, 26D, 26E) are coupled. A variety of different buses may be used in the I/O subsystem 22, including, for example, a Peripheral Component Interconnect bus (PCI), an Industry Standard Architecture (ISA) bus, an extended ISA bus (EISA), a MICRO CHANNEL bus developed by IBM® Corporation of Armonk, N.Y. and so forth. The term MICRO CHANNEL may be protected under Federal and/or State trademark laws. If more than one component bus is present in the I/O bus subsystem 22 (e.g., one or more PCI buses for high bandwidth data transfer and one or more ISA buses to support old-style expansion cards), the buses may be interconnected through a bridge 26C or similar bus-to-bus connection device.

The nature of the I/O devices is determined by the intended purpose of the apparatus 15. For example, if the apparatus 15 is a computer system, the I/O devices (26A, 26B, 26D, 26E) would typically include user-input devices such as a keyboard and cursor control device (e.g., a mouse, trackball or stylus), one or more mass storage devices such as devices for reading and writing data on optical and magnetic storage media, and various other computer system devices (e.g., printer, audio 1/0, serial bus control devices, and so forth). Alternatively, if the apparatus 15 is a digital camera, cell telephone or other consumer electronics device, the I/O devices (26A, 26B, 26D, 26E) might include user interfaces (e.g., buttons and display) to allow the device to be configured for operation and other function-specific devices (e.g., radio-frequency transceiver for cell telephone, aperture and focus control for a digital camera, etc.).

The graphics subsystem 16 includes a graphics accelerator 20 coupled to the subsystem controller 12 to allow high speed transfer of graphics data from the memory subsystem 14 to the graphics subsystem 16 where the graphics data is processed and presented on a display 18 by a display controller 19. In one embodiment, the graphics accelerator 20 is coupled to the subsystem controller via an Accelerated Graphics Port (AGP) that complies with the "Accelerated Graphics Port Interface Specification" Revision 1.0 or later, published Aug. 1, 1996 by the Intel Corporation. The AGP is a dedicated interface for transferring graphics information and commands between the graphics accelerator 20 and the subsystem controller. In alternate embodiments, other dedicated graphics ports may be used. Also, instead of being coupled to the subsystem controller via a dedicated graphics port, the graphics subsystem 16 may alternatively be coupled to the subsystem controller 12 via a shared bus, such as the local bus 11 or a component bus (24, 25) in the I/O subsystem 22.

Figure 2:
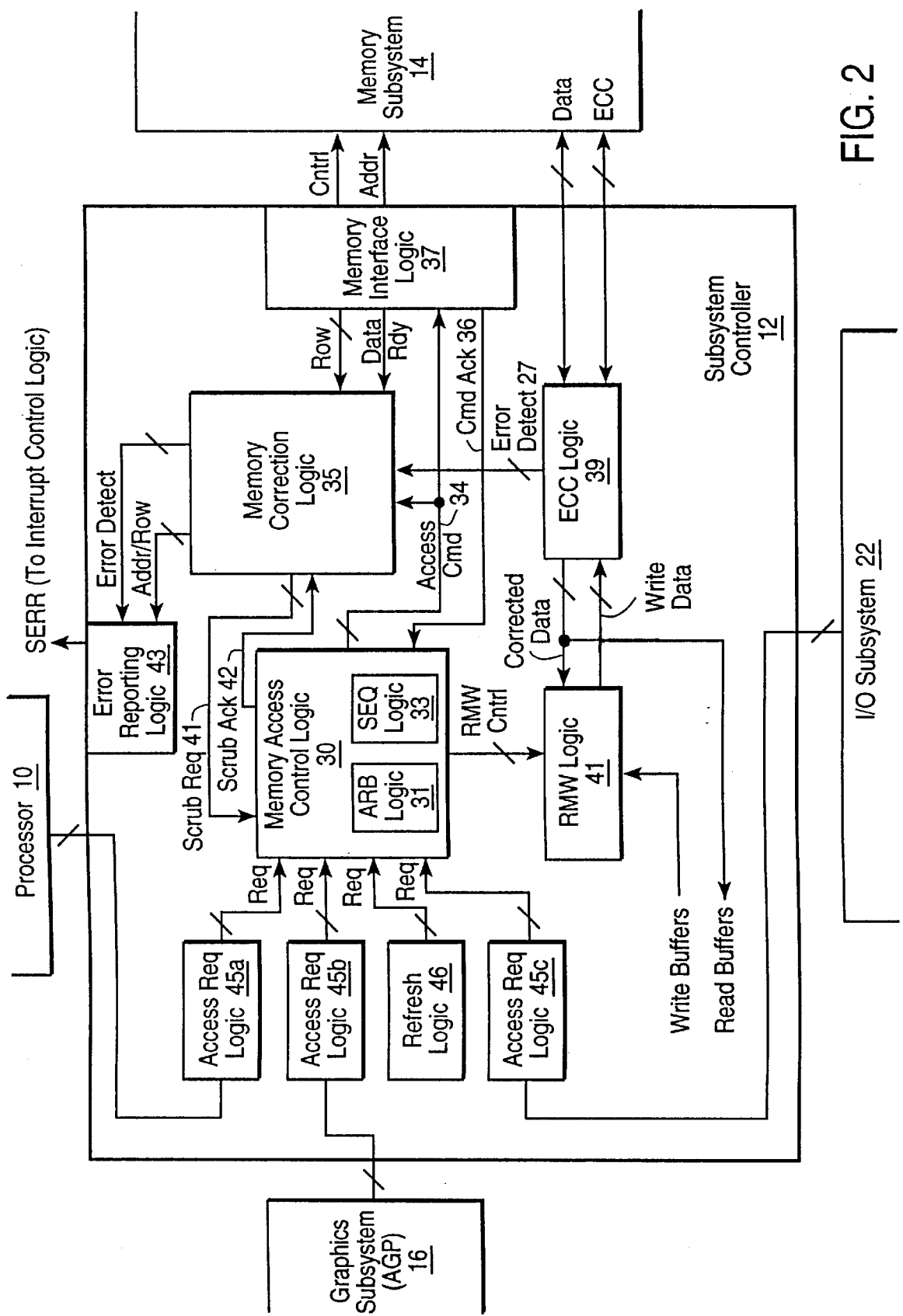
FIG. 2 is a block diagram of one embodiment of a subsystem controller.

FIG. 2 is a block diagram of one embodiment of the subsystem controller 12. The subsystem controller 12 includes access request logic (45A, 45B, 45C), memory access control logic 30, memory interface logic 37, memory correction logic 35, error reporting logic 43, ECC logic 39, and read-merge-write logic 41 (RMW logic). The subsystem controller 12 may also include refresh logic 46 to control the refresh of DRAM cells 14 in the memory subsystem. In alternative embodiments, the refresh logic 46 may be separate from the subsystem controller 12. The subsystem controller 12 may also include other logic (not shown), including logic to manage requests, for example, to transfer data between the processor 10 and the I/O subsystem 22, between the processor 10 and the graphics subsystem 16, or between the graphics subsystem 16 and the I/O subsystem 22.

In one embodiment, the access request logic (45A, 45B, 45C) is used to manage memory access requests received from the processor 10, the graphics subsystem 16, and one or more bus master devices in the I/O subsystem 22. There may also be other requesting agents, including the refresh logic 46 and the memory correction logic 35. Although separate access request logic units (45A, 45B, 45C) are shown for the processor 10, graphics subsystem 16 and I/O subsystem 22, this is not necessary and a single access request logic unit could instead be used to service requests from multiple requesting agents.

The access request logic (45A, 45B, 45C) prioritizes memory access requests according to various criteria (e.g., page hit optimization, data dependency rules, etc.) and then forwards the requests to the memory access control logic 30. This is shown generally in FIG. 2 by the REQ paths from the access request logic (45A, 45B, 45C) and from the refresh logic 46. The "/" symbol across the request paths and other signal transfer paths shown in the various figures indicates that the signal path may include multiple conductors. However, the absence of a "/" symbol on a signal path should not be construed to limit embodiments of the present invention to a single signal conductor for that path. Also, each of the request paths may include parallel paths for concurrently asserting read and write requests to the memory access control logic 30 in separate request paths.

The memory access control logic 30 includes arbitration logic 31 to serialize the parallel memory access requests asserted by the various requesting agents. According to one embodiment, the arbitration logic 31 gives access priority to certain requests from the processor 10 and from the graphics subsystem 16, but otherwise services requests in a manner that ensures memory access to all requesting agents.

As each request is selected to be serviced (i.e., as requests are serialized), the request is forwarded to sequencing logic 33 within the memory access control logic 30. The sequencing logic 33 issues an access command 34 to the memory interface logic 37 according to the request. For example, in one embodiment the sequencing logic 33 generates an access command 34 that includes the address of the memory location to be read, the number of quadwords to be transferred and a read/write signal to indicate whether a memory read or a memory write operation has been requested. When the memory interface logic 37 no longer needs the memory access control logic 30 to assert the access command 34 and is ready to receive a subsequent access command, the memory interface logic 37 asserts a command acknowledge signal to the memory access logic. In response to the memory access control logic, the memory access control logic 30 may issue an acknowledge signal to the requesting agent to indicate that the requested access has been initiated. In one embodiment, for example, the memory access control logic 30 issues a scrub acknowledge signal 42 to the memory correction logic 35 to indicate that a scrub operation has been initiated. This is discussed below in further detail.

In response to an access command 34 from the memory access control logic 30, the memory interface logic 37 asserts control (CNTRL) and address signals (ADDR) to the memory subsystem 14 to perform the commanded operation. In the case of a memory subsystem 14 that includes EDO DRAM components, for example, the memory interface logic 37 asserts a row address strobe signal (RAS) to strobe a row portion of the address (ADDR) into the appropriate DRAM components and a column address strobe signal (CAS) to strobe the remaining portion of the address into the DRAM components to select a portion of the memory page selected by the row portion of the address. In a memory subsystem 14 that includes SDRAM components, various combinations of chip select, row address strobe, and column address strobe signals are used to control the operation of the memory subsystem. Other memory control techniques may be used for other types of memory, including, for example, a memory made up of RAMBUS® DRAM components. Also, in a hybrid memory subsystem (e.g., one that contains both EDO DRAM and SDRAM components) the protocol for asserting the control signals (CNTRL) may be changed from one access to the next to support the different types of components.

In one embodiment, the memory interface logic 37 also includes row decode logic (not shown in FIG. 2) to determine which row of a plurality of rows of memory components is to be read or written in a given memory access and to issue a chip select signal to select the component row. Herein, the expression "component row" refers to one or more memory ICs (integrated circuits) that are selected to concurrently output (or receive) data via respective portions of a data path. For example, in one embodiment of a memory subsystem 14, a component row may consist of four DRAM devices that each supply a respective word (i.e., one 16-bit value) of a quadword data value. In the case where a component row includes only one memory IC, the one memory IC may drive all or only a portion of the data path when selected. As shown in FIG. 2, a row decode signal (ROW) that identifies the selected component row is output from the memory interface logic 37 to the memory correction logic 35 to support certain error reporting functions. The memory interface logic 37 also issues a data ready signal (DATA RDY) when the memory subsystem 14 asserts a data value at its output.

As shown in FIG. 2, data values and ECC values output from the memory subsystem 14 are supplied to the ECC logic 39. For each data value received from the memory subsystem 14, the ECC logic 39 determines whether the data value is corrupted, signals the memory correction logic 35 via one or more error detect signals 27 (ERROR DETECT) to indicate whether the data value is corrupted, and, if the data is corrupted, attempts to recover the data value. The data value is then forwarded from the ECC logic to the RMW logic 41 via the data path labeled CORRECTED DATA. The data value may alternatively be forwarded to various read buffers (not shown) associated with respective requesting agents. Note that despite the name CORRECTED DATA, a data value transferred from the ECC logic via the CORRECTED DATA PATH may be corrupt if it had a non-correctable error.

In one embodiment, the RMW logic 41 is controlled by the sequencing logic 33 in the memory access control logic 30 via one or more RMW control signals (RMW CNTRL) and is used to supply data to the memory subsystem 14 via the ECC logic 39 in memory write operations. Data read from memory may be merged with data from other write buffers and written back to memory via the data path labeled WRITE DATA. In an embodiment discussed below, corrected data is buffered within the RMW logic 41 and then written back to the memory subsystem 14 at an address provided by the memory correction logic 35.

Based on the foregoing description of the access request logic (45A, 45B, 45C), the memory access control logic 30, the memory interface logic 37 and the RMW logic. 41, it will be appreciated that, together, these logic units constitute access logic for reading data from and writing data to the memory subsystem 14. It will be further appreciated that the access logic may include other logical units, including, but not limited to, read buffers and write buffers associated with various requesting agents.

In one embodiment, the memory correction logic 35 snoops the access command path 34 to the memory interface logic 37 to determine when the memory access control logic 30 has initiated a memory read operation. As discussed below, this snooped information is used in conjunction with the one or more error detect signals 27 output by the ECC logic 39 to generate requests to the memory access control logic 30 to write a corrected data value back to the memory subsystem 14. The memory correction logic 35 also forwards the one or more error detect signals 27 to the error reporting logic 43 along with snooped address information and component row information (received via the row decode signal (ROW) from the memory interface logic). This is indicated in FIG. 2 by the ERROR DETECT and ADDR/ROW signal paths extending from the memory correction logic 35 to the error reporting logic 43. As discussed below the memory correction logic 35 senses the data ready signal output by the memory interface logic 37 to determine when each access command has been completed.

In one embodiment, the error reporting logic 43 includes one or more processor-accessible, reporting registers and also includes logic to generate a system error signal (SERR) in response to the one or more error detection signals forwarded by the memory correction logic 35. By storing the component row and address of corrupted data in a processor-accessible register within the error reporting logic and asserting SERR to interrupt the processor 10, the processor 10 may be informed of the memory corruption and take corrective action. For example, the processor 10 may be programmed to log the failure information in a database for diagnostic purposes or the processor 10 may block access to the afflicted region of memory by allocating other memory in the memory subsystem 14 to be used instead. The component row information may be particularly helpful to service personnel, because a component row is often located on a single, field-replaceable memory card such as a dual inline memory module (DIMM). In alternative embodiments, the reporting registers in the error reporting logic 43 may be accessible by other agents in a computer system such as the graphics subsystem or a bus master device in the I/O subsystem 22.

Figure 3:
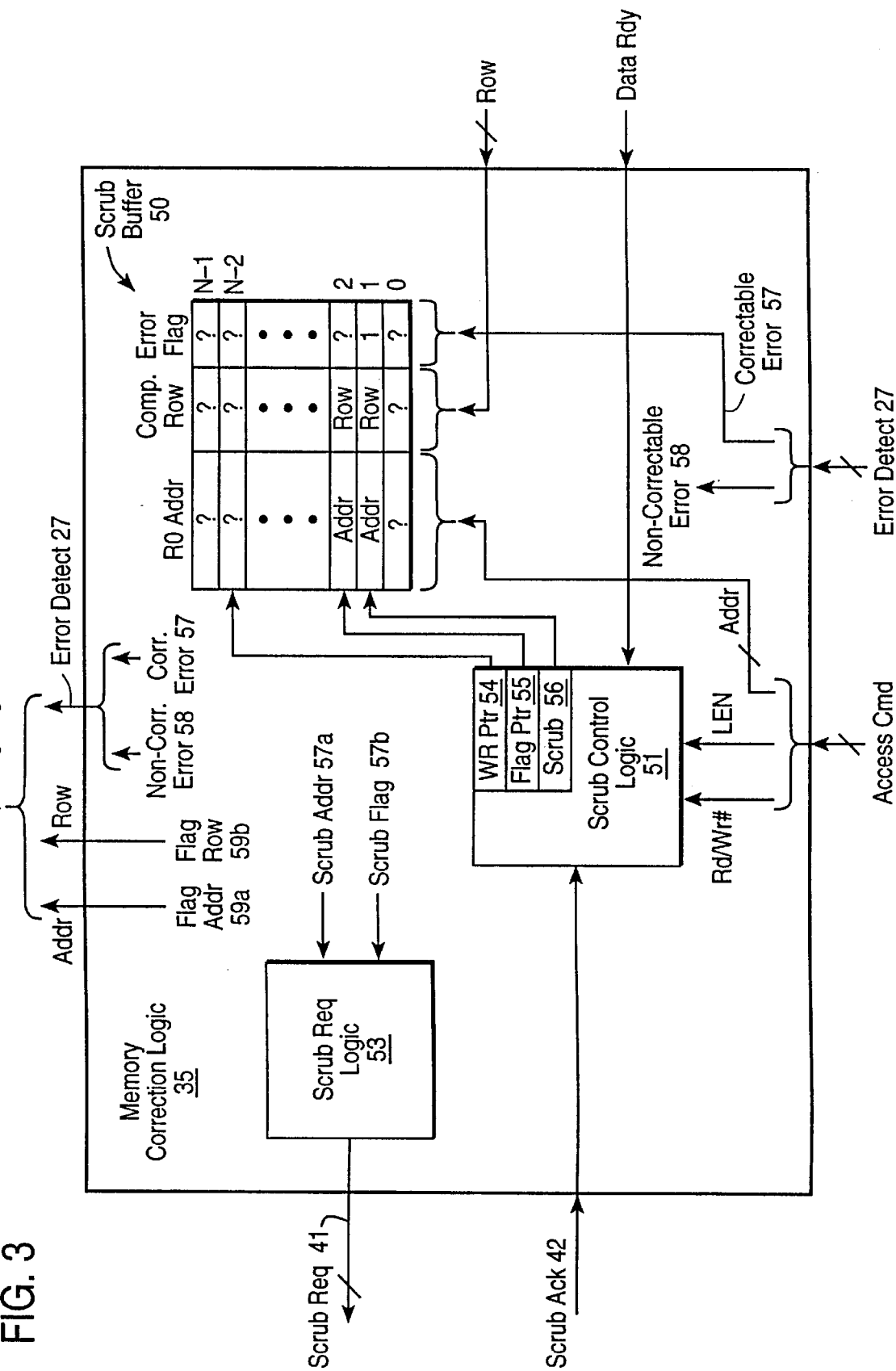
FIG. 3 is a block diagram of memory correction logic according to one embodiment.

FIG. 3 is a block diagram of an embodiment of the memory correction logic 35. The memory correction logic 35 includes an N-entry scrub buffer 50, scrub control logic 51 and scrub request logic 53. In one embodiment, the scrub buffer 50 is used to hold address, component row and error information generated for each memory read operation. The scrub control logic 51 includes a write pointer 54 and a flag pointer 55 to determine which entry in the scrub buffer 50 is to receive a given set of address, row and error information. In one embodiment, the scrub request logic 53 is used to issue a scrub request (SCRUB REQ) to the memory access control logic (e.g., element 30 of FIG. 2) based on information in the scrub buffer 50 pointed to by the flag pointer 55. A scrub pointer 56 is maintained by the scrub control logic 51 to indicate an entry in the scrub buffer 50 for which a scrub request is pending.

As mentioned above, each access command asserted to the memory interface logic (e.g., element 37 of FIG. 2) by the memory access control logic includes a read/write signal (RD/WR*) to indicate whether the commanded memory operation is a read operation or a write operation, a transaction length (LEN) to indicate the number of values to be transferred in succession before the read or write operation is completed and an address (ADDR) to the memory subsystem at which the access is to take place. In one embodiment, RD/WR* and LEN are snooped by the scrub control logic 51 and used to determine when to advance the write pointer 54 and the flag pointer 55. The data ready (DATA RDY) signal is asserted for each data value output from the memory subsystem and is used in conjunction with the transaction length (LEN) to determine when a given read access is complete. For example, if a command to read four quadwords is issued by the memory access control logic (i.e., four quadwords are to be transferred in succession to complete the read access), then the memory correction logic counts the assertions of the data ready signal until four assertions (the number indicated by the transaction length) have been detected. Subsequent assertions of the data ready signal can then be assumed to correspond to another access command.

When an access command is issued by the memory access control logic, the scrub control logic 51 senses the RD/WR* signal to determine whether a read operation or a write operation has been initiated. If a read operation is indicated, the address (ADDR) included in the access command is stored in a scrub buffer entry indicated by the write pointer 54. The component row value (ROW) output by the memory interface logic is also stored in the entry pointed to by the write pointer (i.e., in the COMP. ROW column) and, after the address and row values have been stored, the write pointer 54 is advanced to indicate the next available entry in the scrub buffer 50. Note that a delay element, such as a flip-flop (not shown), may be placed in the access command path to synchronize the receipt of the component row value (ROW) and the address information (ADDR) at the scrub buffer 50.

In one embodiment, the write pointer 54 is advanced in succession until a last entry in the scrub buffer 50 is reached. At that point, the write pointer 54 is wrapped around to the beginning entry in the buffer. The flag pointer 55 and scrub pointer 56 may likewise be wrapped from the end to the beginning of the scrub buffer 50, though the criteria for their advancement is different from the write pointer 54. Thus, in at least one embodiment, the scrub buffer 50 is managed by the scrub control logic 51 as a circular buffer.

At the time address and row information is written to an entry in scrub buffer 50, the error flag portion of the entry (i.e., the value in the error flag column) is usually undetermined, because the data value that corresponds to the address in the scrub buffer entry has not yet been output from the memory subsystem. In fact, due to the pipelined nature of memory access operations, the write pointer 54 may be advanced in response to several access commands before data corresponding to the first of the commands is output from the memory subsystem. According to one embodiment, the flag pointer 55 is used to indicate the least recently stored entry in the scrub buffer 50 for which data has not yet been output from the memory subsystem. This yet-to-be-output data is referred to herein as pending data. Thus, in at least one embodiment, the flag pointer 55 indicates the oldest scrub buffer entry for which data is pending.

As previously discussed, ECC logic may be used to generate one or more error detect signals (ERROR DETECT) based on an ECC and a data value output from the memory subsystem. In one embodiment, the one or more error detect signals include at least a correctable error indicator 57 that indicates whether the output data value is corrupted by an error that can be corrected by the ECC logic. When the data ready signal (DATA RDY) is asserted, indicating that a previously pending data value has been output from the memory subsystem, the scrub control logic 51 enables the correctable error indicator 57 into the error flag portion of the scrub buffer entry pointed to by the flag pointer 55. For example, a zero-valued error flag may be stored to indicate that the data has no correctable error and a non-zero error flag may be stored to indicate a correctable error. After the error flag is stored in the scrub buffer entry, the flag pointer 55 is advanced to indicate the next entry in the scrub buffer 50, which is now the oldest scrub buffer entry for which data is pending.

In one embodiment, when the transaction length (LEN) indicates that multiple data values are to be transferred to complete a commanded memory access, the flag pointer 55 is not advanced until after the data ready signal has been asserted LEN number of times. Respective assertions of the correctable error indicator 57 may be logically combined (e.g., by a logical OR function) to determine a composite error flag for the multiple output values. In one embodiment, the starting address for a multiple-transfer memory access is recorded in the scrub buffer 50 and left unchanged as each successive data value is output. In an alternate embodiment, the starting address may be incremented by the scrub control logic 51 and rewritten to the scrub buffer entry pointed to by the flag pointer 55 after each data ready assertion. Using this technique, the address in the scrub buffer 50 tracks each of the multiple output values so that the address from which corrupted data is obtained may be accurately identified. To account for the possibility of multiple errors within a multiple-transfer memory access, multiple error flags may be stored per scrub buffer entry.

In one embodiment, the address and error flag from an entry pointed to by the scrub pointer (i.e., the scrub entry) are output to the scrub request logic 53. If the error flag from the scrub entry (i.e., the scrub flag) indicates a correctable error, the scrub request logic issues a scrub request 41 that includes the address from the scrub entry (i.e., the scrub address). After the scrub request 41 has been issued, the scrub control logic 51 waits for assertion of the scrub acknowledge signal 42 before advancing the scrub pointer 56.

In response to the scrub request 41, the memory access control logic issues a read-merge-write access which causes a data value to be read from the memory subsystem at the scrub address, passed through the ECC logic to generate a corrected version of the data value, and buffered in the RMW logic (e.g., element 41 of FIG. 2). As discussed below, the sequencing logic within the memory access control logic then causes the corrected version of the data value in the RMW logic to be written back to the memory subsystem at the scrub address. The overall operation of reading, correcting and writing back a data value from an address specified in a scrub request is referred to herein as a scrub operation because its effect is to overwrite corrupted data in the memory subsystem with corrected data. Thus, unlike prior art systems which only correct data during transfer from the memory subsystem to a consumer, the various embodiments of the present invention are able to correct corrupted data at its memory subsystem source.

In one embodiment, the memory access control logic gives scrub requests priority over requests from other requesting agents and blocks other requests until after the scrub operation is completed. Consequently, the scrub control logic 51 may assume that the access command issued after a scrub request corresponds to a scrub operation, and control the advancement of the scrub pointer 56 in conjunction with the scrub acknowledge signal 42. Because a scrub operation actually involves two memory accesses, a read followed by a write, two command acknowledge signals (e.g., signal 36 in FIG. 2) are generated by the memory interface logic during the scrub operation one for each memory access. In one embodiment, the memory access control logic (e.g., element 30 of FIG. 2) issues a scrub acknowledge signal 42 to the memory correction logic 35 after receiving a command acknowledge signal acknowledging a command to write corrected data to the memory subsystem. When the scrub acknowledge signal 42 is received, the error flag in the scrub entry is cleared and the scrub pointer is advanced to another scrub buffer entry that has a set error flag. If there are no other entries for which the error flag is set, the scrub buffer need not be advanced. Alternatively, the absence of errors may be indicated by assigning the scrub pointer 56 to point to an out-of-range entry or by assigning the scrub pointer 56 to point to a specific entry containing a cleared error flag.

Returning briefly to the scrub buffer 50, it should be noted that while the address supplied from the memory access control logic to the memory interface logic may include a number of bits N necessary to uniquely identify a memory location in the memory subsystem, the corresponding address stored in the scrub buffer 50 may include less than N bits. Further, the address value forwarded to the error reporting logic may include all or less than all of the address bits in the address stored in the scrub buffer 50. More specifically, while in some embodiments it may be desirable to store or report the entire set of N bits per asserted address, in other embodiments it may be desirable to drop some of the less significant bits of the address stored in the scrub buffer 50 or reported to the error reporting logic. For example, only the address bits required to identify the page of memory might be stored in the scrub buffer. In that case, when a scrub request is issued, the entire page of memory may be read and written back with corrected values. As a matter of terminology, the act of storing an address in the scrub buffer is to be understood herein to mean storing either an address that identifies a uniquely addressable location in the memory subsystem from which a data value is read or an address that identifies a region of addressable locations in the memory subsystem that includes the uniquely addressable location in the memory subsystem from which the data value is read.

Still referring to FIG. 3, in one embodiment, the one or more error detect signals 27 and the address and component row information in the buffer entry pointed to by the flag pointer (i.e., the flag address and the flag row) are output to the error reporting logic (e.g., element 43 of FIG. 2). If the one or more error detect signals 27 indicate an error, the address and component row from which the corrupted data was obtained may be recorded and the processor or other error handling agents may be notified as described above.

Figure 4:
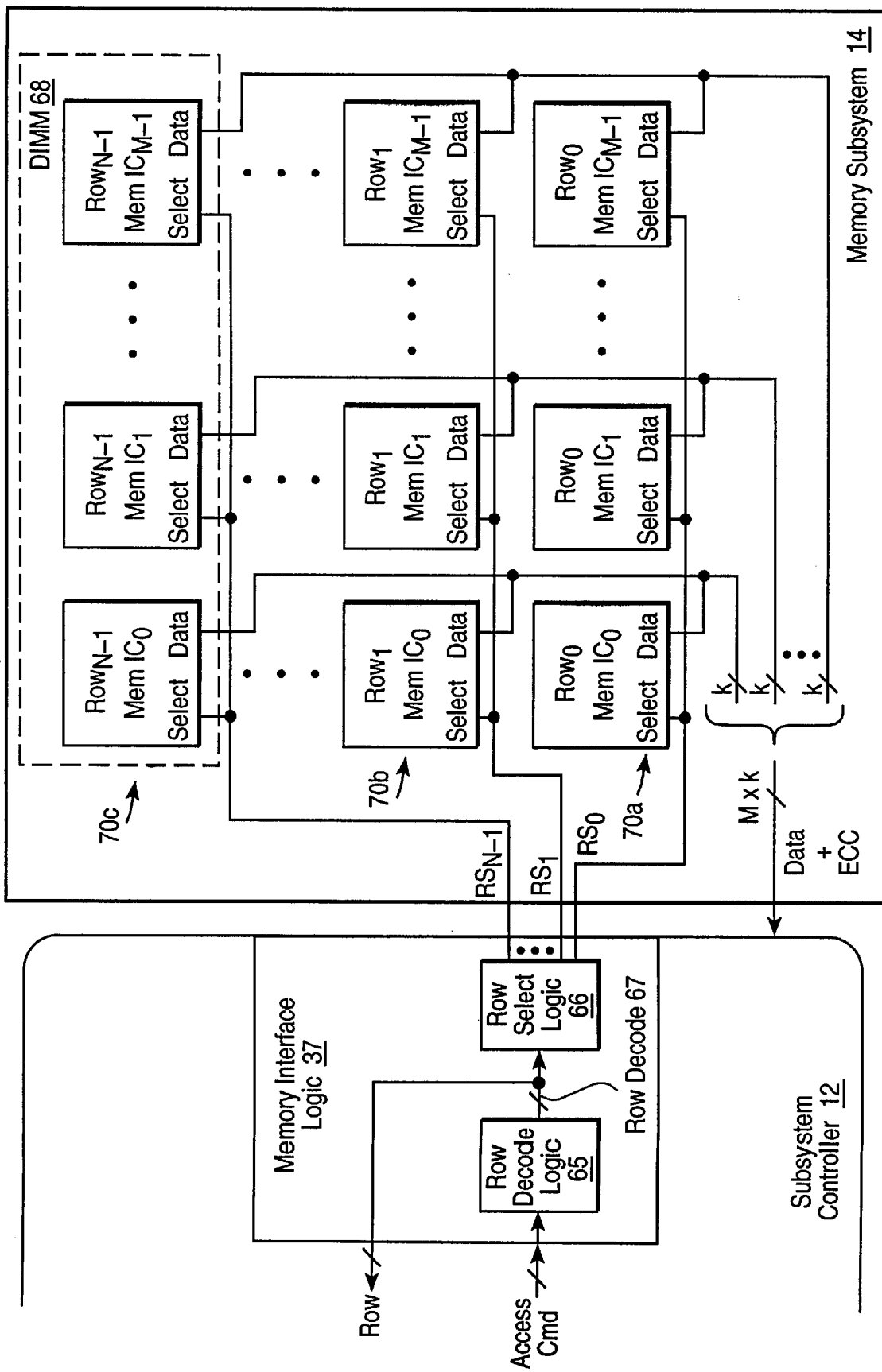
FIG. 4 illustrates an embodiment of a memory subsystem that contains multiple component rows.

FIG. 4 illustrates an embodiment of the memory subsystem 14 that contains multiple component rows (70A, 70B, 70C). As shown, each of the rows may be located on a separate DIMM 68. This is advantageous from an equipment maintenance standpoint, because failures reported for a given component row can be corrected by replacing the corresponding DIMM without having to replace other DIMMs. In an alternative embodiment, multiple rows may be located on a DIMM or the entire memory may be implemented in a single IC or at least in a set of IC's on a single circuit board.

As previously discussed, the memory interface logic 37 in the subsystem controller 12 receives memory access commands from the memory access control logic. Row decode logic 65 within the memory interface logic 37 determines, based on the address portion of an access command, which of the plurality of rows (70A, 70B, 70C) is to be accessed and generates a row decode signal 67 accordingly. The row decode signal 67 is output to the memory correction logic as discussed above, and is also input to row select logic 66 to activate one of a plurality of row select lines ($RS_0$–$RS_{N-1}$). In one embodiment (shown in FIG. 4), each of the row select lines ($RS_0$–$RS_{N-1}$) is coupled to select inputs of a respective row of discrete, memory integrated circuits (ICs). For example, row select line $RS_0$ is connected to Row 0 memory $IC_0$ through Row 0 memory $IC_{M-1}$, row select line $RS_1$ is connected to Row 1 memory $IC_0$ through Row 1 memory $IC_{M-1}$, and so forth through Row N-1. In this way, the memory ICs from a single component row are concurrently selected to receive or output data in a given memory cycle. The width of the data value transferred per memory access is implementation dependent and is given generally by M×K, with M being the number of memory IC's per component row and K being the number of data bits transferred per memory IC. For the purpose of the present discussion, the data value may be considered to include the ECC value. Further, although contents of memory are generally referred to herein as data or data values, such expressions are to be understood as including program instructions as well (e.g., op codes, byte codes, etc.).

Still referring to FIG. 4, the select input of the memory ICs may vary depending on the type of memory component used. In an SDRAM component, for example, the select input would typically be a chip select input and the row select lines ($RS_0$–$RS_{N-1}$) would carry chip select signals. For an EDO DRAM component, the select input would typically be a row address strobe input and the row select lines would carry row address strobe signals. Other row selection schemes may be used to support other types of memory without departing from the spirit and scope of the present invention.

Figure 5:
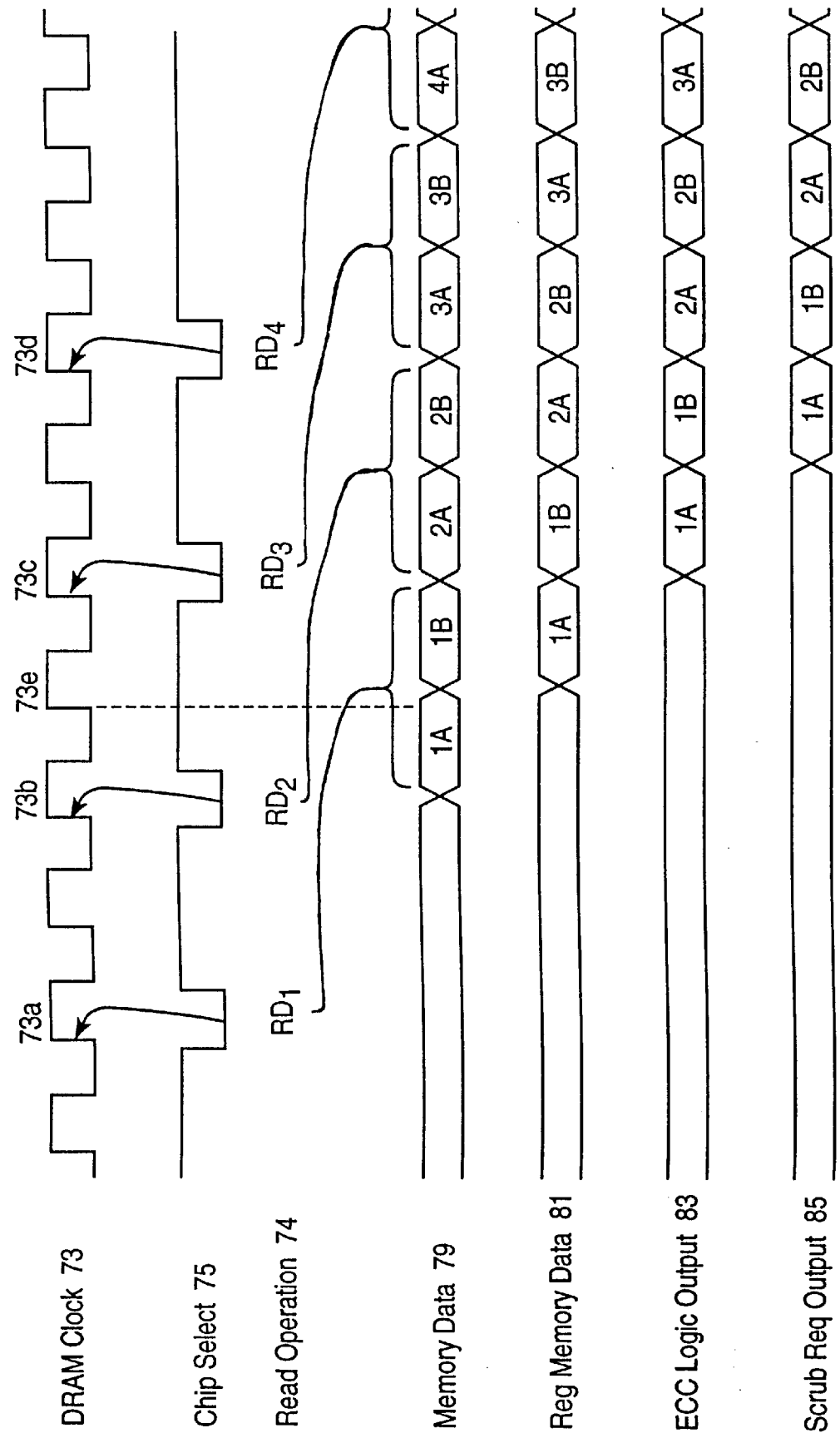
FIG. 5 is a timing diagram illustrating pipelined access to a memory subsystem.

FIG. 5 is a timing diagram illustrating pipelined access to the memory subsystem under control of a DRAM clock signal 73. For the purpose of FIG. 5, the memory subsystem is assumed to be made up of SDRAM components although, as discussed above, other memory components including EDO DRAM and RAMBUS® DRAM could also be used.

To illustrate the pipelined memory access, an exemplary sequence of four read operations 74 is assumed, with each read operation requiring two quadwords to be output from memory. To initiate a first of the read operations, RD1, a chip select signal is asserted (held low) during a rising edge 73A of the DRAM clock signal 73. Because, in this example, each read operation requires two quadwords to be output from memory, the chip select signal for the second read operation, RD2, is asserted during rising DRAM clock edge 73B, two clock cycles after rising edge 73A. The chip select signals for the third and fourth read operations, RD3 and RD4, are likewise asserted in two-clock-cycle increments during rising edges 73C and 73D. After assertion of the chip select signal to strobe an address into the SDRAM, a number of clock cycles (e.g., three) are required before the SDRAM outputs valid data. Thus, as shown by the memory data signal 79, data value 1A, which is the first value sought by the RD1 operation, is not sampled until DRAM clock edge 73E—three clock cycles after the chip select was asserted, and after the chip select for the RD2 operation has been asserted. Thus, an access command for the second read operation RD2 is issued before data for the first read operation is output. This is referred to as a pipeline. Despite the fact that one or more additional read requests are initiated between the start of the operation RD1 and the output of data value 1A, data value 1A is nonetheless determined to correspond to the RD1 operation by virtue of a well defined latency between the start of a read operation and the output of corresponding data.

Data value 1B, the second value sought by RD1, is not sampled until clock edge 73C, the same clock edge for which the chip select for the RD3 operation is sampled. Data values 2A/2B, 3A/3B and 4A/4B are similarly pipelined. Further, because some DRAM DIMMs provide registers to buffer certain control signals, the depth of the pipeline (i.e., the latency between assertion of chip select and output of corresponding data) may be extended by yet another DRAM clock period. This is shown by the registered memory data signal 81. After the data value is output from the memory subsystem, an additional clock cycle may be consumed by the ECC logic so that by the time the memory correction logic receives a correctable error signal that corresponds to the RD1 access command, the RD2 and RD3 access commands may already have been issued. This is indicated in FIG. 5 by the ECC Logic Output 83 for which data value 1A does not become valid until after the RD3 access has been initiated. As shown by the scrub request output 85, by the time the error correction logic issues a scrub request for data value 1A (assuming a scrub operation is necessary), as many as four or more access commands may already have been issued by the memory access control logic.

As shown by FIG. 5, multiple DRAM clock cycles may pass between the time a read operation is initiated and the time that pending data is output and passed through the ECC logic. During that time, additional access commands may be issued. From an error correction standpoint, pipelined memory access of this nature presents a problem because the address information associated with a given access command may be unavailable by the time the requested data is output from the memory subsystem. As discussed above, in various embodiments of the present invention, this problem is solved by buffering at least the address portion of access commands that correspond to read operations so that, if corrupted data is detected, the address portion of the access command can be recalled and supplied to the memory access control logic in a request to write a corrected version of the data back to the memory subsystem at the buffered address.

FIGS. 6A, 6B, 6C, 6D, 6E, 6F, 6G and 6H illustrate the manner in which an exemplary set of read operations are handled by the memory correction logic. In FIG. 6B–FIG. 6G, a scrub buffer, write pointer, flag pointer and scrub pointer are shown according to the embodiments described in reference to FIG. 3. Other scrub buffer implementations and pointer arrangements may be used without departing from the spirit and scope of the present invention. For example, though a column of component row information is shown in FIG. 6B–FIG. 6G, this column may be omitted in an alternate embodiment.

FIG. 6A lists five exemplary commands to read data from the memory subsystem. The address from which data is read is shown for each command along with an indication of whether an error was detected in the data value read.

FIG. 6B depicts the state of the scrub buffer after the first read operation has been initiated. The write pointer initially points to entry zero and is advanced to point to entry one after the address, 0 500 000, and component row, 0, have been written into entry zero. This operation is referred to as "loading" an entry of the scrub buffer. Assuming that there are no other entries in the scrub buffer, the flag pointer is assigned to point to entry zero while data for entry zero is pending (i.e., yet to be output from the memory subsystem). The scrub pointer is indicated to be N/A (not applicable) because no error flags have been set. As discussed above, the N/A status of the scrub pointer may be signified, for example, by assigning an out-of-range value to the scrub pointer, or by assigning the scrub pointer to point to a scrub buffer entry having a cleared error flag (i.e., an error flag set to a non-error-indicating state). The contents of the error flag column (EFLAG) are indicated to be unknown (i.e., "?") for entry one, while the data value is pending. To prevent the scrub pointer from inadvertently being advanced, the contents of the error flag column may be cleared for all scrub buffer entries upon system power up. The contents of the address, row and error flag columns for entry one are also indicated to be unknown because the entry is yet to be loaded.

FIG. 6C illustrates the state of the scrub buffer after the second read operation has been initiated. The write pointer has been advanced to entry two after entry one is loaded with address and component row information. The flag pointer remains pointed at entry zero because entry zero is the oldest entry for which data is pending. The scrub pointer remains N/A.

Figure 6D:
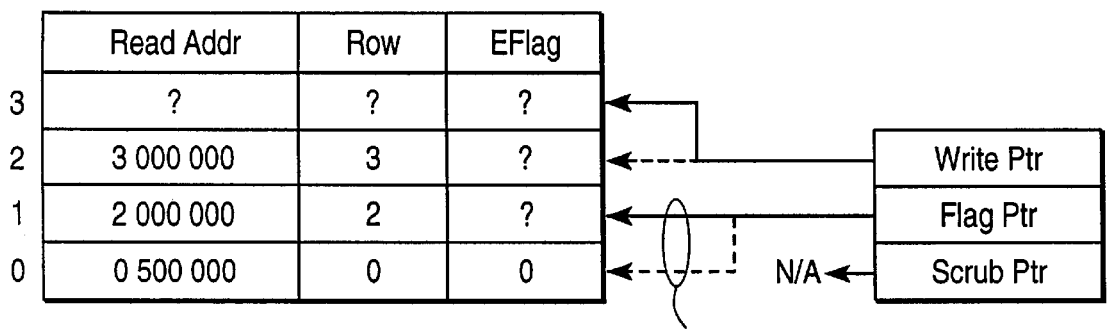
FIG. 6D depicts the scrub buffer after a third read operation has been initiated.

FIG. 6D illustrates the state of the scrub buffer after a third read operation has been initiated. Scrub buffer entry two is loaded with address and component row information corresponding to the third read operation and the write pointer is advanced to entry three. At some point prior to initiation of the fourth read operation, the data value pending for entry zero is output from the memory subsystem and passed through the ECC logic. Because no error is detected for the first read operation in this example (i.e., the data was clean), a zero-valued error flag is recorded in the scrub buffer entry pointed to by the flag pointer. Note that the use of a zero-valued error flag to indicate clean data is arbitrary and a non-zero value may alternatively be used to indicate clean data. In either case, assigning a value to the error flag that indicates clean data is referred to as clearing the error flag, and assigning a value that indicates corrupt data is referred to as setting the error flag. After the error flag has been cleared, the flag pointer is advanced to point to scrub buffer entry one, which is now the oldest scrub buffer entry for which data is pending.

Figure 6E:
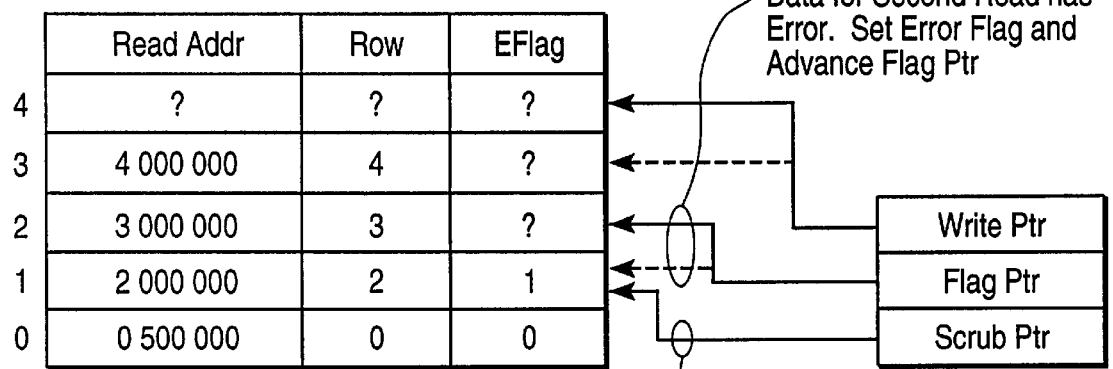
FIG. 6E depicts a scrub buffer after a fourth read operation has been initiated and after data corresponding to a first read operation has been output from a memory subsystem.

FIG. 6E illustrates the state of the scrub buffer after the fourth read operation has been initiated and after data corresponding to entry one has been output by the memory subsystem. As indicated, the third entry is loaded with address and component row information corresponding to the fourth read operation, and the write pointer is advanced to point to entry four. Because an error has been detected in the output data value, the error flag for entry one is set and the flag pointer is advanced to entry two. As discussed above the address and component row information in entry one may be forwarded to error reporting logic. Also, because the error flag for entry one is set, the scrub pointer is assigned to point to entry one (i.e., entry one becomes the scrub entry). The scrub request logic, which receives the address and error flag values from the scrub entry, will detect that the error flag is set and issue a scrub request. In one embodiment, until a scrub acknowledge is received that indicates acknowledgment of an access command to write a corrected data value to the memory subsystem at the scrub address, the error flag in the scrub entry remains set and the scrub pointer is not advanced.

Figure 6F:
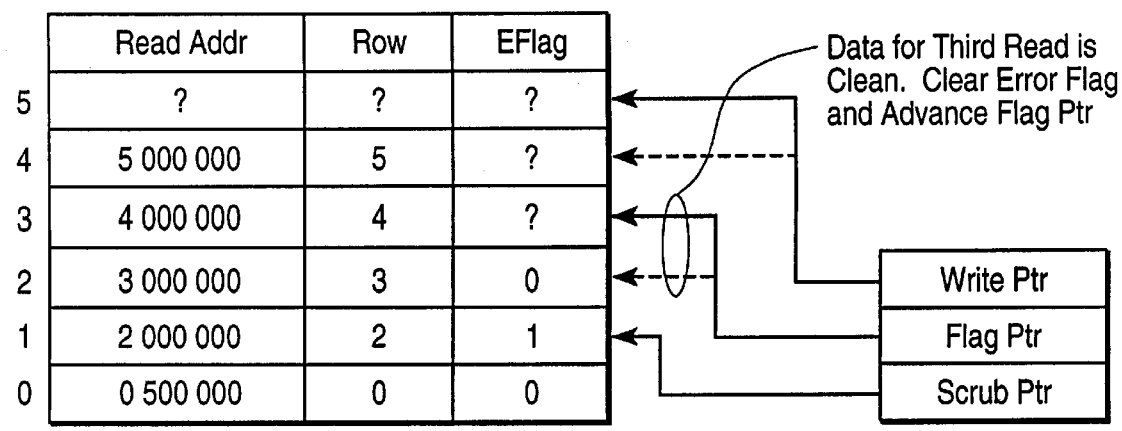
FIG. 6F depicts a scrub buffer after a fifth read operation has been initiated and after data corresponding to a second read operation has been output from a memory subsystem.

FIG. 6F illustrates the state of the scrub buffer after the fifth read operation has been initiated and after data corresponding to scrub buffer entry two has been output by the memory subsystem. Entry four is loaded with the address and component row information corresponding to the fifth read operation, and the write pointer is advanced to scrub buffer entry five. Depending on the number of entries in the scrub buffer, advancing the write pointer will eventually entail wrapping the write pointer back to entry zero. Because the data associated with scrub buffer entry two is clean, the error flag for entry two is cleared and the flag pointer is advanced. The scrub pointer remains pointed at entry one.

Figure 6G:
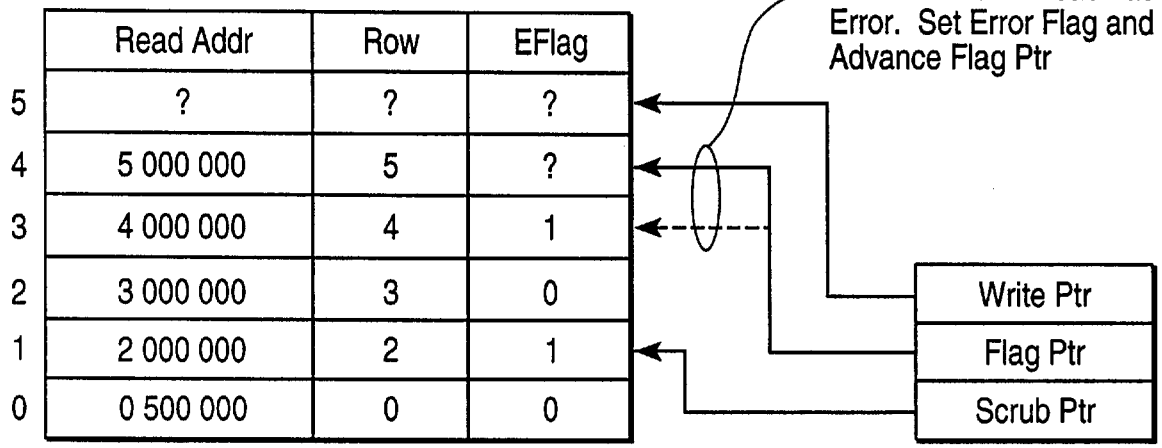
FIG. 6G depicts a scrub buffer after data corresponding to a third read operation has been output from a memory subsystem.

FIG. 6G illustrates the state of the scrub buffer after data corresponding to entry three has been output. The entry three error flag is set and the flag pointer is advanced. Because, in this example, no new read operations have been initiated, the write pointer remains pointed at entry five. The scrub pointer remains pointed at entry one.

Figure 6H:
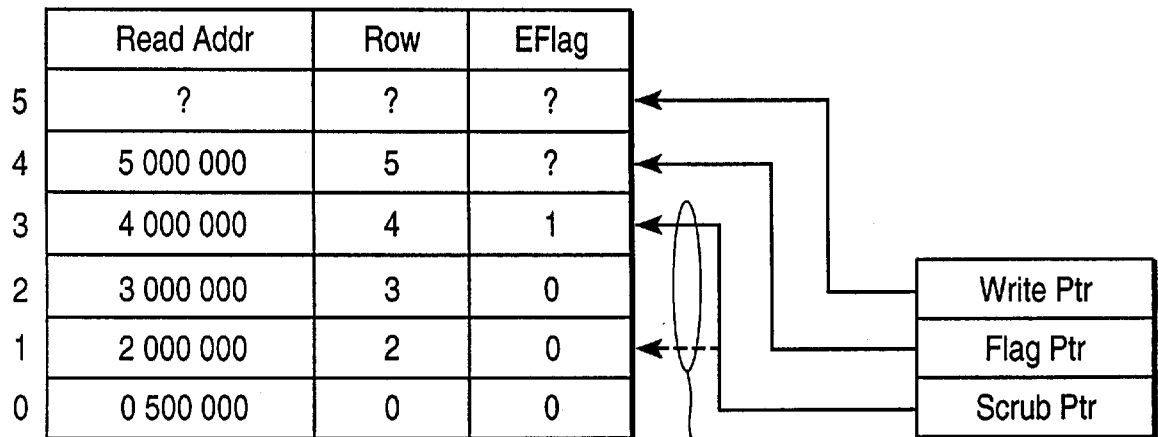
FIG. 6H depicts a scrub buffer after a scrub operation is determined to be complete or initiated.

In FIG. 6H, the scrub operation requested for entry one is acknowledged. According to one embodiment, the error flag value for the entry is cleared and the scrub pointer is advanced to the next scrub buffer entry for which an error flag is set (in this example, entry three). Because entry three is now the scrub entry, the address and error flag from entry three are supplied to the scrub request logic. Because the entry three error flag is set, the scrub request logic issues a scrub request to write a corrected data value to the memory subsystem at the address from entry three.

Figure 7:
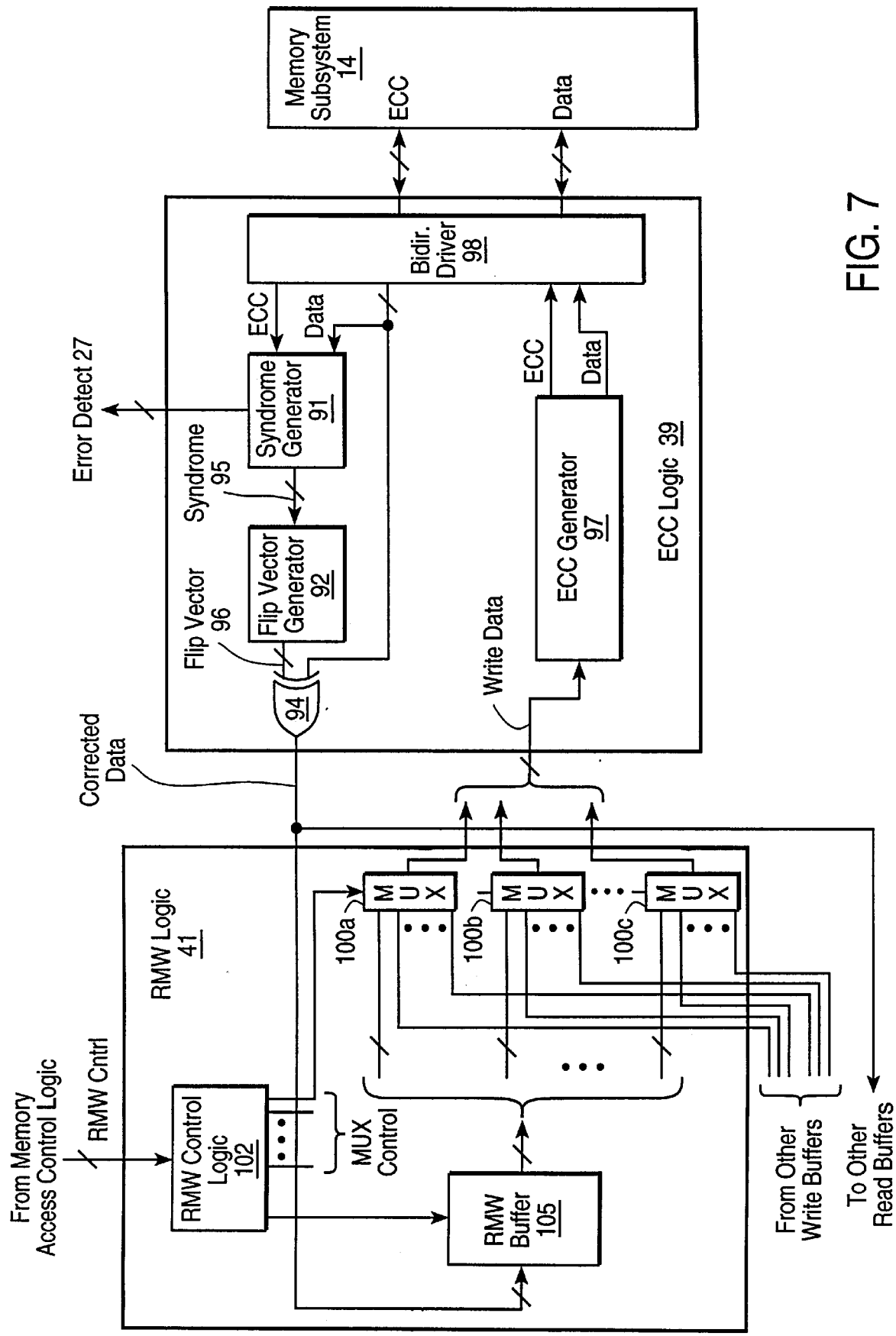
FIG. 7 illustrates an embodiment for writing corrected data back to a memory subsystem.

FIG. 7 illustrates the manner in which corrected data is written back to the memory subsystem according to one embodiment. As indicated, data and ECC values output from the memory subsystem 14 are passed through a bidirectional driver 98A and input to a syndrome generator 91 within the ECC logic 39. Based on a combination of the ECC and its corresponding data value, the syndrome generator 91 outputs a value called a "syndrome" 95 as well as one or more error detect signals 27. If the one or more error detect signals 27 indicate that the data has a correctable error, the memory correction logic may generate a scrub request and report the error as discussed above.

The syndrome 95 is supplied to a flip vector generator 92 to produce a flip vector 96. In one embodiment, the flip vector 96 is exclusively OR'd with the data value (e.g., using logic element 94) to produce a corrected data value. More specifically, if the data value output by the memory subsystem 14 has one or more identifiable, flipped bits, a flip vector 96 containing set bits in positions corresponding to the failure positions in the data value is exclusively OR'd with the data value to restore the data value to a corrected state. If the data value has no flipped bits, a zero-valued flip vector 96 may be applied. If the data value has one or more unidentifiable flipped bits, the data is deemed to be irrecoverably corrupt.

Assuming for present purposes that a corrupted data value is corrected by the ECC logic 39, the data value is supplied to the RMW logic 41. According to one embodiment, the RMW logic 41 includes RMW control logic 102, a RMW buffer 105, and multiplexers (100A, 100B, 100C). The RMW control logic 102 receives RMW control signals (RMW CNTRL) from the memory access control logic to support at least two types of operations: partial write operations and scrub operations.

A partial write operation refers to writing a smaller quantum of data than permitted by the granularity of the memory subsystem 14 (e.g., writing a word-sized value into a memory subsystem that can be accessed only with quad-word granularity). One way to perform a partial write operation is to overwrite a portion of a data value read from the memory subsystem 14 with the data to be written (i.e., to merge the data to be written and the value read from memory) and then to write the merged value back to the memory subsystem 14. In one embodiment, this is accomplished using multiplexers (100A, 100B, 100C) to merge data from one of a number of write buffers with data stored in the RMW buffer 105. In response to one or more RMW control signals from the memory access logic, the RMW control logic 102 causes a data value output by the ECC logic 39 to be stored in the RMW buffer 105 and asserts multiplexer control signals to the multiplexers (100A, 100B, 100C) to merge the data value in the RMW buffer 105 with data from another write buffer. The merged data value is then supplied to the memory subsystem 14 (via the ECC generator 97 in the ECC logic 39) where it is written to the appropriate address.

According to one embodiment, the circuitry used to perform the above-described read-merge-write operation is also used to support scrub operations. In response to a scrub request, the memory access control logic issues RMW control signals to cause a corrected data value to stored in the RMW buffer 105 and then steered through the multiplexers (100A, 100B, 100C) without modification by partial write data from other write buffers. The corrected data value from the RMW buffer 105 is then written to memory at the address supplied in the scrub request. In one embodiment, the corrected data value output from the RMW buffer 105 is passed through the ECC generator 97 in the ECC logic 39 so that a corrected data value and its corresponding ECC are stored in the memory subsystem 14.

It will be appreciated that the above described embodiment for servicing scrub requests makes use of many of the same logic elements and data paths used to support partial write operations. By leveraging read-merge-write logic in this manner, various embodiments of the present invention may be implemented with reduced gate count and therefore at reduced cost. Despite these advantages, embodiments in which separate logic is used for the read-merge-write and scrub operations would not depart from the spirit and scope of the present invention.

Figure 8:
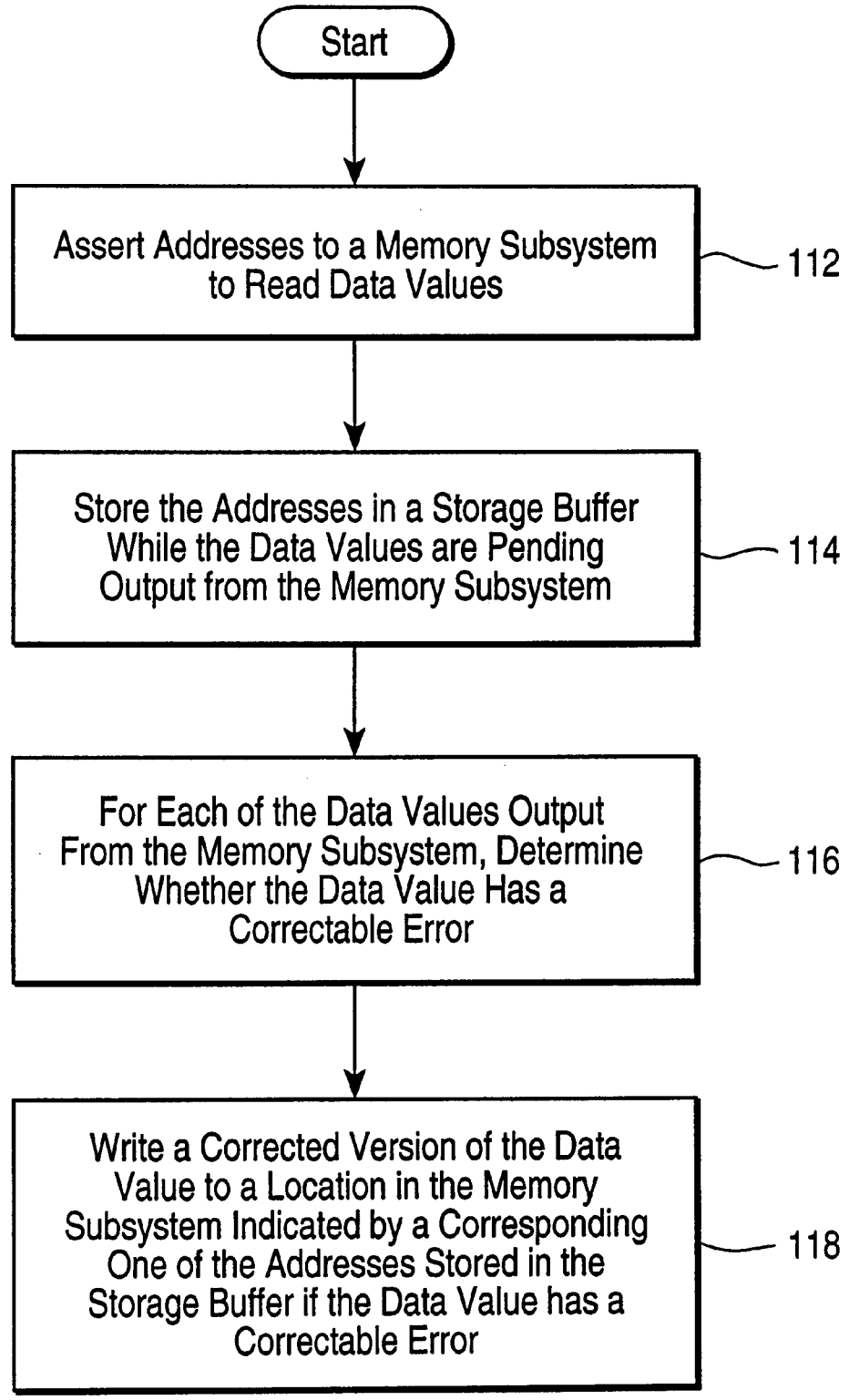
FIG. 8 is a flow diagram of a method according to one or more embodiments of the present invention.

FIG. 8 is a flow diagram of a generalized method according to one or more embodiments of the present invention. At step 112, addresses are asserted to a memory subsystem to read data values from the memory subsystem. At step 114, the addresses are stored in a storage buffer while the data values are pending output from the memory subsystem. For each of the data values output from the memory subsystem, a determination of whether the data value has a correctable error is made at step 116. If the data value has a correctable error, then at step 118 a corrected version of the data value is written to a location in the memory subsystem indicated by a corresponding on e of the addresses stored in the storage buffer.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly to be regarded in an illustrative rather than a restrictive sense.

What is claimed is:

1. An apparatus comprising:

access logic to access a memory;

error detection logic to generate an error signal for each data value output by the memory to indicate whether the data value has a correctable error; and correction logic coupled to the access logic and to the error detection logic to request the access logic to write to the memory a corrected version of each data value indicated by the error signal to have a correctable error, the correction logic comprising control logic to determine whether an access command generated by the access logic to access the memory indicates a memory read operation.

2. The apparatus of claim 1 wherein the correction logic includes:

a storage buffer to hold addresses asserted in memory read operations;

a write pointer to indicate a respective entry in the storage buffer at which each of the addresses is to be stored; and a flag pointer to indicate an entry in the storage buffer containing a least recently stored one of the addresses for which data is pending output from the memory.

3. The apparatus of claim 2 wherein the correction logic further includes a scrub pointer to indicate an entry in the storage buffer for which a corresponding data value output from the memory has a correctable error.

4. The apparatus of claim 3 wherein the request to the access control logic includes an address from the storage buffer entry indicated by the scrub pointer.

5. The apparatus of claim 2 wherein the flag pointer is advanced to indicate a successive entry in the storage buffer after pending data is output from the memory and after a flag value that indicates whether the data value has a correctable error is stored in the storage buffer entry indicated by the flag pointer.

6. The apparatus of claim 5 wherein the flag value is determined based on the error signal.

7. The apparatus of claim 6 wherein the scrub pointer is advanced to point to another entry in the storage buffer for which the flag value indicates a correctable error after the pending request to write a corrected data value is acknowledged.

8. The apparatus of claim 5 wherein the correction logic further includes a scrub pointer to indicate an entry in the storage buffer containing a least recently stored address that has been supplied to the access logic in a pending request to write a corrected data value to the memory.

9. The apparatus of claim 2 wherein the correction logic further includes a scrub pointer that indicates an entry in the storage buffer containing a least recently stored address that has been supplied to the access logic in a pending request to write a corrected data value.

10. The apparatus of claim 9 wherein the address and the row value in the storage buffer entry indicated by the flag pointer are supplied to error reporting logic if the pending data value, when output by the memory, is indicated by the corresponding error signal to have a correctable error.

11. The apparatus of claim 2 wherein the address in the storage buffer entry indicated by the flag pointer is supplied to error reporting logic if the pending data, when output by the memory, is indicated by the corresponding error signal to have a correctable error.

12. The apparatus of claim 2 further comprising memory interface logic that asserts a signal to the correction logic to indicate which row of a plurality of rows of memory components is accessed during a memory read operation and wherein the correction logic stores a row value indicating the accessed row together with a corresponding one of the addresses in an entry in the storage buffer.

13. An apparatus for correcting corrupted data, the apparatus comprising:

access logic to access a memory in response to memory access requests from one or more requesting agents;

error detection logic to assert a first error signal if data read from a first location in the memory is corrupt; and correction logic to detect assertion of the first error signal and to assert in response a memory access request to the access logic to write a corrected version of the data to the first location, the correction logic comprising control logic to determine whether an access command generated by the access logic to access the memory indicates a memory read operation.

14. An apparatus for correcting corrupted data, the apparatus comprising:

means for accessing a memory in response to memory access requests from one or more requesting agents;

means for asserting a first error signal if data read from a first location in the memory is corrupt; and means for detecting assertion of the first error signal and for asserting in response a memory access request to the means for accessing to write a corrected version of the data to the first location, the means for detecting comprising means for determining whether an access command generated by the means for accessing indicates a memory read operation.

15. A method for correcting corrupted data comprising:

determining whether memory accesses to a memory at specified addresses are read operations to read data values therefrom;

if the memory accesses to the memory are read operations, storing the addresses in a storage buffer while the data values are pending output from the memory;

determining, for each of the data values output from the memory, whether the data value has a correctable error; and writing a corrected version of the data value to a location in the memory indicated by a corresponding one of the addresses stored in the storage buffer if the data value has a correctable error.

16. The method of claim 15 wherein the step of storing the addresses includes the step of storing in the storage buffer at least a most significant portion of each of the address asserted to the memory.

17. The method of claim 15 further comprising the step of storing row values in the storage buffer to indicate which row of a plurality of rows of memory components is accessed to read each respective one of the data values.

18. The method of claim 17 further comprising the step of transferring a row value and an address from the storage buffer to error reporting logic for access by a processor if the corresponding data value output by the memory has a correctable error.

19. The method of claim 15 further comprising the steps of:

storing each of the addresses in a respective storage buffer entry indicated by a write pointer; and storing, for each of the data values, a flag value indicating whether the data value has a correctable error in a respective storage buffer entry indicated by a flag pointer, the respective storage buffer entry indicated by the flag pointer also including a corresponding one of the address from which the data value was read.

20. The method of claim 19 further comprising the steps of:

maintaining a scrub pointer to indicate an entry in the storage buffer having a flag value that indicates a correctable error; and clearing the flag value in the storage buffer entry indicated by the scrub pointer after the step of writing a corrected version of the data value is commenced.

21. The method of claim 20 wherein the step of writing a corrected version of the data value to a location in the memory includes the step of writing a corrected version of the data value to the memory at an address in the storage buffer entry pointed at by the scrub pointer.

22. The method of claim 15 wherein the step of writing a corrected version of the data value to a location in the memory includes the steps of:

reading the data value from the location in the memory;

generating the corrected version of the data value based on an error correction value associated with the data value; and writing the corrected version of the data value to the location in the memory.

23. A computer system comprising:

a processor;

a memory that includes a plurality of random access memory components; and a controller coupled to the processor and the memory, the controller including access logic to access the memory in response to requests from the processor;

error detection logic to generate an error signal for each data value output by the memory to indicate whether the data value has a correctable error; and correction logic coupled to the access logic and to the error detection logic to request the access logic to write to the memory a corrected version of each data value indicated by the error signal to have a correctable error, the correction logic comprising control logic to determine whether an access command generated by the access logic to access the memory indicates a memory read operation.

24. A computer system comprising:

a processor;

a memory that includes a plurality of extended-data-out dynamic random access memory (EDO DRAM) components; and a controller coupled to the processor and the memory, the controller including access logic to access the memory in response to requests from the processor;

error detection logic to generate an error signal for each data value output by the memory to indicate whether the data value has a correctable error; and correction logic coupled to the access logic and to the error detection logic to request the access logic to write to the memory a corrected version of each data value indicated by the error signal to have a correctable error, the correction logic comprising control logic to determine whether an access command generated by the access logic to access the memory indicates a memory read operation.

25. A computer system comprising:

a processor;

a memory that includes a plurality of synchronous dynamic random access memory (SDRAM) components; and a controller coupled to the processor and the memory, the controller including access logic to access the memory in response to requests from the processor;

error detection logic to generate an error signal for each data value output by the memory to indicate whether the data value has a correctable error; and correction logic coupled to the access logic and to the error detection logic to request the access logic to write to the memory a corrected version of each data value indicated by the error signal to have a correctable error, the correction logic comprising control logic to determine whether an access command generated by the access logic to access the memory indicates a memory read operation.

* * * * *

UNITED STATES PATENT AND TRADEMARK OFFICE
CERTIFICATE OF CORRECTION

PATENT NO. : 5,987,628
DATED : November 16, 1999
INVENTOR(S) : Von Bokern et al.

It is certified that error appears in the above-identified patent and that said Letters Patent is hereby corrected as shown below:

In column 3, at line 38, delete "1/O" and insert --I/O--.

Signed and Sealed this

Twenty-second Day of May, 2001

Attest:

NICHOLAS P. GODICI

*Attesting Officer*    *Acting Director of the United States Patent and Trademark Office*